Nov. 8, 1949  C. F. CAPELL  2,487,694
ENEMA AND DOUCHE ASSEMBLY
Filed June 17, 1948  2 Sheets-Sheet 1
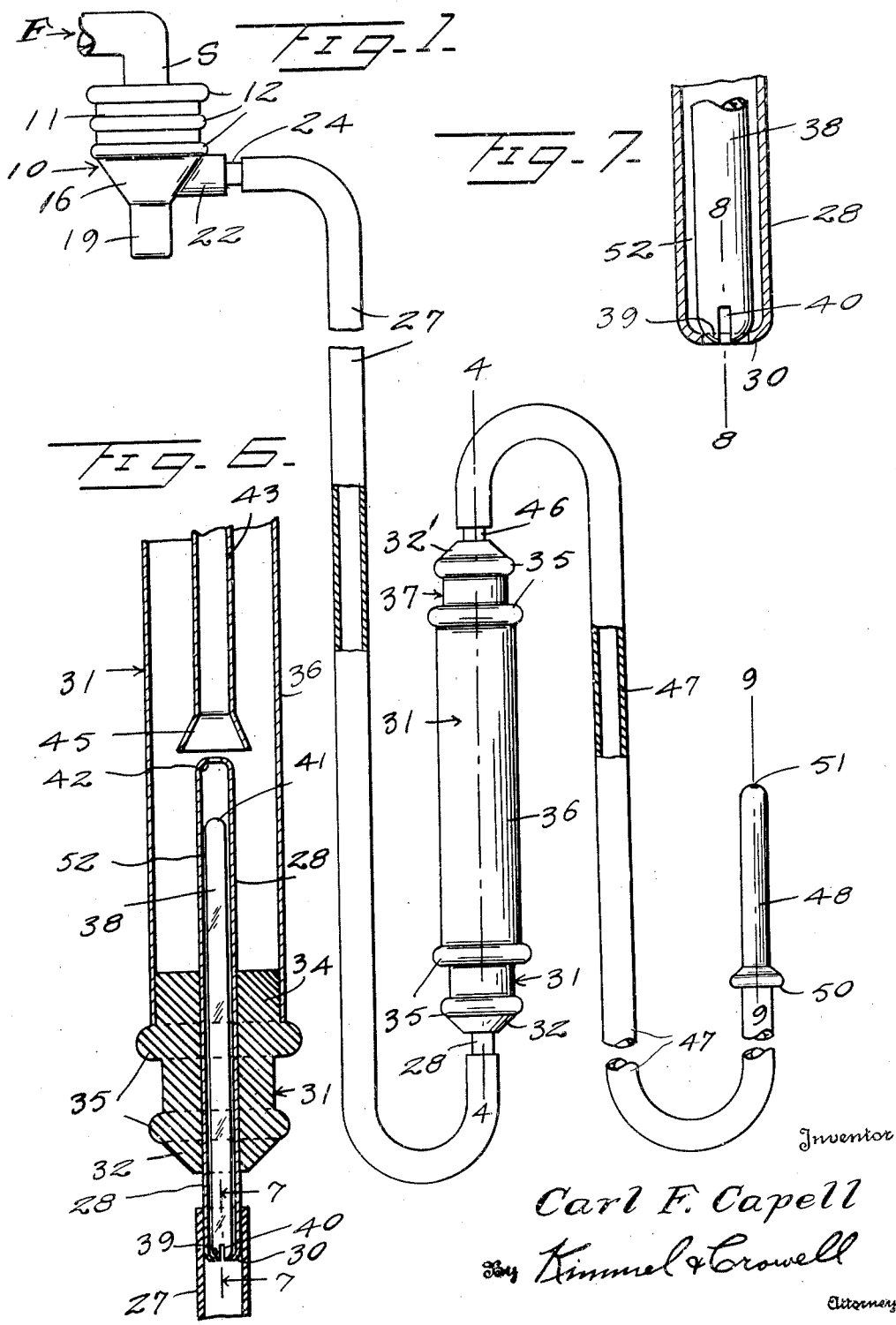
Inventor
Carl F. Capell
By Kimmel & Crowell
Attorneys Nov. 8, 1949　　　C. F. CAPELL　　　2,487,694
ENEMA AND DOUCHE ASSEMBLY
Filed June 17, 1948　　　　　　　　　　2 Sheets-Sheet 2
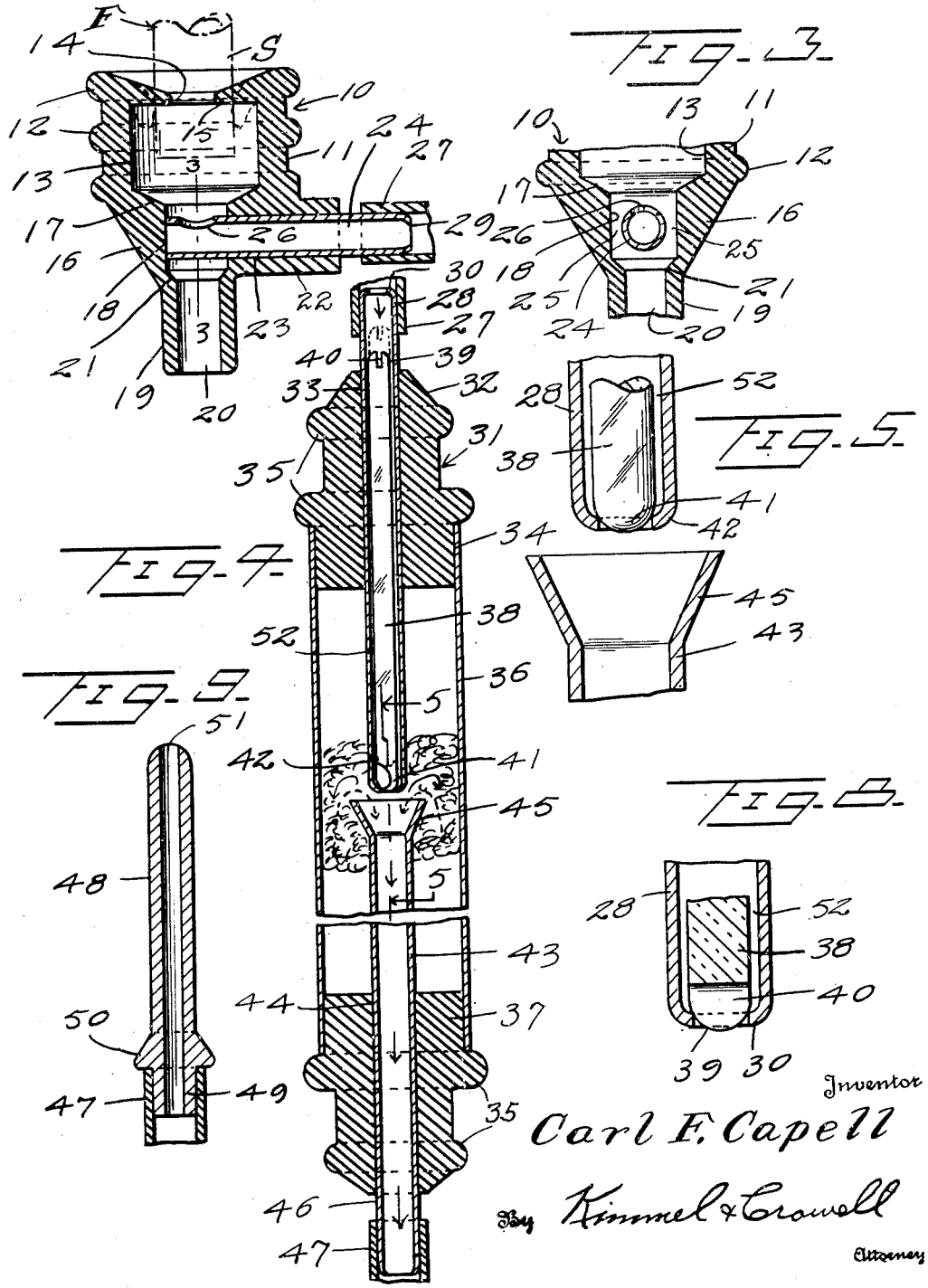
Inventor
Carl F. Capell
By Kimmel & Crowell
Attorneys Patented Nov. 8, 1949

2,487,694

UNITED STATES PATENT OFFICE 2,487,694

ENEMA AND DOUCHE ASSEMBLY

Carl Frank Capell, Santa Monica, Calif.

Application June 17, 1948, Serial No. 33,530

8 Claims. (Cl. 128—229)

My invention relates to an enema and douche assembly or fountain syringe with an automatic antiseptic or medicine dispenser combination.

In ordinary fountain syringes or enema and douche assemblies, the antiseptic or medicine materials, whether solid, powder or liquid, for dissolution with water or other liquid, are usually put into the liquid in specified proportions for use as prescribed. The present invention and improvement consists in providing an enema and douche assembly which includes a dispenser containing the antiseptic or medicant in contact or through which the water at the proper temperature from a duplex or mixing faucet is caused to flow by connection of the device to the faucet spout so that the medicant is automatically siphoned or sucked off with the water to form a solution of the proper proportions of water and antiseptic or medicine.

An object is to provide a novel and simple enema and douche assembly in which when the water pressure through the device and medicant is too high, the flow will be cut off to prevent injury to delicate parts being treated, the device permitting the insertion of a proper amount of medicant to be taken or picked up as by siphoning and dissolving action and thoroughly mixed with the water in proper proportions as required, and being designed to be used in or employed with a line of low pressure water flow from a suitable water supply under pressure or a pressure head, as from a faucet at proper temperature.

Another object is to provide means to permit the water flow or cutting off thereof when desired in addition to cutting off the flow when there is too much pressure and is also superior to the type employing a hose clamp to permit or cut off the flow and not automatic in its action, and also, to provide means to adjust or regulate the proportions of the water and medicant in solution for treatment, by varying the amount, volume of water and time interval in which the full amount of the medicant contained in the valve and siphon member will be taken up by the water in flowing through the device, such as one gallon of water in approximately three minutes time duration of flow and means for conveniently filling the dispensing and mixing container with antiseptic or medicant.

A further object is to provide an enema and douche device or assembly with an antomatic antiseptic or medicant dispenser employing a container for a given or desired quantity of medicant picked up by and thoroughly mixed with the water when flowing and shut off when the dispenser is in a horizontal position even when the water is turned on for adjusting the temperature and to flow when the dispenser is in a vertical or upright position with the water flowing upward, which will permit the water temperature to be set or adjusted as desired and means whereby the flow may be cut off when desired by slightly jarring the medicant container and valve rod therein while the water is flowing through the outlet but will automatically and instantly cut off the flow when the pressure is too high or excessive thereby acting as a safeguard against injury which would be caused by too much pressure for enema or douche use, as has been determined by actual use and thorough test for effectiveness and perfect performance.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is an elevation of the enema and douche assembly or fountain syringe embodying my invention applied to a faucet as when in use.

Figure 2 is an enlarged fragmentary section at the faucet adaptor.

Figure 3 is an enlarged section taken on the line 3—3 of Figure 2.

Figure 4 is an enlarged section taken on the line 4—4 of Figure 1.

Figure 5 is an enlarged section of the lower end portion of the flow control in a closed position taken on the line 5—5 of Figure 4.

Figure 6 is a fragmentary section of the medicant container and dispenser in an inverted or reverse position from that shown in Figures 1 and 4.

Figure 7 is an enlarged fragmentary section taken on the line 7—7 of Figure 6.

Figure 8 is a section taken on the line 8—8 of Figure 7.

Figure 9 is a section taken on the line 9—9 of Figure 1.

Referring to the drawings, the device comprises an adaptor 10 which may be a molded hollow soft rubber or like flexible or compressible body having a substantially cylindrical upper portion 11 which may have a plurality, preferably three, upper, intermediate and lower external peripheral annular stiffening and reinforcing ribs 12 and an internal water flow chamber 13 which receives the spout or outlet nozzle S of a faucet F which is preferably a duplex or mixing faucet for hot and cold water to adjust the outlet temperature as desired, through a restricted opening 14 in an inwardly tapered and downwardly inclined or sloping apertured diaphragm or inwardly extending relatively thin and flexible annular web 15 to flex or bend downwardly on applying the same upwardly over the spout S as seen in Figures 1 and 2, to form a suction friction grip on the faucet to retain the adaptor thereon and support the rest of the device suspended therefrom as will be later described.

The adaptor body 10 is reduced or tapered downwardly toward the bottom as at 16 with an annular inwardly and downwardly inclined upwardly facing bottom or shoulder 17 with a reduced central or axial opening and chamber 18 of ½ inch or other diameter and a reduced bypass, outlet tube or vent nozzle 19 of uniform smaller diameter depending therefrom with a smaller bore 20 of ⅜ inch or other size into which chamber 18 bevels or tapers as at 21 in the same manner as at shoulder or bottom 17 for discharge of surplus water at the bottom portion of the adaptor when flow through the device is restricted or stopped as will be later set forth.

Intermediately, chamber or bore opening 18 has a lateral radial or horizontal tubular outlet extension or coupling nipple 22 with a ⅜ inch or other diameter bore 23, although it is to be understood that the basic arrangement is a right angular bore or one perpendicular to the other, which may be interchangeably used as normal outlet and surplus discharge with a by-pass. As shown, a hard or rigid discharge tube 24 of preferably transparent $\frac{7}{16}$" or other diameter and 2 inch or other length plastic, such as synthetic resin, methylacrylate, glass, or even rubber, whether transparent, translucent or opaque, though the former is preferred as the action or flow therethrough can be readily seen or observed in addition to the actual outlet flow from the device, is fitted in the bore 23 of tubular outlet extension or coupling nipple 22 to extend diametrically of and horizontally through bore or chamber 18 to seat against the opposite side of the bore or chamber 18 and provide clearance spaces or by-passes 25 on opposite sides for by-pass water flow through outlet tube 19 at bore 20 as seen in Figures 2 and 3.

The tube 24 is provided with a hole 26 in its upper side which may be ¼ inch diameter or otherwise to permit the flow of the water into the tube and out through a flexible rubber or like tube 27 fitted over the end of the tube 24 which extends beyond the extension 22. The tube 27 is preferably about 4 feet long and connects to the contracted end of a plastic or like tube 28 over which it is fitted in the same manner as the opposite end of the tube 27 is coupled to the tube 24. Tube 24 may have a restricted end 29 formed by annealing or otherwise and the end of the tube 28 is also provided with an inturned portion, flange or restriction 30 forming a valve rod seat or stop.

Tube 28 constitutes part of a dispensing and mixing container 31 consisting further of a soft rubber, cork or like tubular member or plug 32 with a bore 33 therethrough in which the tube 28 is frictionally or adjustably received with the end of the tube 28 opposite to that end to which the tube 27 is attached extending beyond the cylindrical cork inner end 34 of the member or plug 32 a considerable distance. Fitting member 32 is preferably tapered at its outer end and provided with a pair of spaced peripheral annular ribs 35, the inner one of which is larger than the outer one so as to seat against an open ended cylindrical container 36. Container 36 is sufficiently large to hold the necessary quantity of powdered or liquid antiseptic or other medicant to be mixed in solution with the water and frictionally and snugly receives end 34 in one end thereof. It is also preferably of transparent plastic or other suitable transparent material the same as described in connection with the tube 24 and this is also true relative to the tube 28 which extends a considerable distance into the container tube 36 which may be of 1¼" outer diameter or otherwise. Container 36 may be filled with the medicant upon removal of the fitting member or plug 32, or removal of a fitting member or plug 37 of the same material and construction as the member 32' fitted into the end opposite to the end in which the member 32 is engaged.

Tube 28 movably receives a valve rod 38 which is relatively heavy, shiftable and of solid non-rusting or non-corroding material such as stainless steel or chrome brass having a somewhat convex, semi-spherical or rounded end 39 cooperating with the restricted concaved stop or shoulder 30 but normally spaced therefrom and provided with a diametrically extending slot 40 to permit the water to pass when the valve rod 38 shifts to seat or engage against end 30 of tube 28 and moves or unseats from the opposite end of tube 28. The opposite end of the valve rod 38 is provided with a similar convex end 41 and it should be noted that the rod 38 is preferably of the same shape cross sectionally but smaller than the bore of the tube 28 to fit loosely in the tube 28 with a clearance of $\frac{1}{32}$" all around, as by having the rod 38 of ¼ inch diameter and the tube of $\frac{7}{16}$" outer diameter and $\frac{5}{16}$" inner diameter to allow a proper film of water to pass through the clearance space therebetween sufficient for enema use without lifting the valve from stop 30. The remote end of the tube 28 which cooperates with the end 41 of the valve rod 38 is formed with a concavo-convex inturned flange or concaved seat 42. A tube 43 of the same material and diameter or slightly larger than tube 28 as shown, is fitted through the bore 44 of the member 37, the tube 43 being frictionally held in said bore for adjustment and the member or plug 37 being frictionally held in the remote end of the container 36. The inner end of the tube 43 is provided with an enlarged flared or funnel-like portion 45 of frusto-conical form which may be axially or longitudinally adjusted relative to the adjacent end of the tube 28 and valve rod 38 to vary the spacing therebetween and thus the quantity of the medicant picked up by the siphon action of the water passing from the discharge end of the tube 28 into the tube 43 at the funnel 45 and partially escaping into the container 36 to mix with the medicant therein and carry it off in solution with the water in proper proportions as may be desired and depending upon the use or part being treated. By way of example, this arrangement may be such that it can be finely regulated to a nicety such as sufficient to carry off the container of medicant in passing the first gallon of water through said parts in approximately three minutes after being started or otherwise, and so that the medicant will be gradually incorporated and uniformly and thoroughly mixed with the water upon the flow thereof.

The tube 43 which constitutes the discharge tube of the container 36 for the outlet of the water and medicant or solution formed thereby, projects from the tapered end of the plug fitting 37 which, incidentally, may be of any suitable material such as soft rubber or cork, as indicated at 46 and is adapted for the attachment of one end of a flexible rubber tube or the like 47 engaged thereover and substantially 2 feet long or of other desired length. Tube 47 has mounted in its free end a standard enema or douche nozzle or fitting 48 having a reduced end 49 fittted in the tube 47 at its free end and an adjacent shoulder 50 abutting said end, while the opposite end of the nozzle 48 is open as indicated at 51.

In the use and operation of the device as described, the adaptor 10 is fitted on the faucet before or after the temperature of the water by the combination of the hot and cold water has been adjusted or regulated to the proper point. The water then flows through the opening or hole 26 into the tube 24 and through the flexible tube 27 to the container 31 at the restricted end or seat 30 of the tube 28 to flow around the rod 38 through the annular clearance space 52 and into the container 36 partly by reason of deflection at the concentric wall or funnel 45 but primarily into the latter end through the tube 43 and subsequently into the flexible tube 47, into nozzle 48, from which nozzle the water is discharged. When the container is in a horizontal position and the water is turned on or allowed to flow as described, or in the position shown in Figures 4 and 5, the valve rod 38 will automatically close at the valve seat 42 in conjunction with the convex end 41 of the valve rod and due to the pressure of the water acting against the end 39 and the weight of the rod 38. In the inverted position, as seen in Figure 6, the valve rod 38 will move from the normally seated and closed position of end 41 against seat 42, as shown in Figures 4 and 5, so that its end 39 will engage the seat or stop 30. When container 36 is in vertical inverted position with water flow upward through the container as viewed in Figure 6, valve rod 38 remains in open position and rests on valve stop 30 due to the weight of the valve rod. Valve rod 38 remains in this position during enema operation. Slot 40 on the inlet end of valve rod 38 is $\frac{3}{32}$" wide by $\frac{1}{4}$" deep which gives sufficient freedom of flow of water for enema use at a maximum pressure, all without valve rod 38 being lifted from stop 30. While this maximum pressure is in use, an enema may meet with some obstruction in the bowels. The back pressure is automatically released out the vent by-pass 25. The only time valve rod 38 moves to close the end 41 against the seat 42 is when the pressure reaches a danger point and for safety will close instantly and stay closed until the pressure is lowered. The plastic tube 28 by being $\frac{7}{16}$" outer diameter x $\frac{5}{16}$" inner diameter is sufficient for allowing a proper $\frac{1}{32}$" film of water for maximum passage around $\frac{1}{4}$" valve rod 38 for enema use without lifting valve rod 38 from stop 30. This fixed proportion affords a simple and assured action as a safety shut-off to the split part of an ounce over pressure required for its use. The important feature is the application of a combination automatic water operated siphon medical antiseptic dispenser connected to a source of relatively high pressure water supply and having an outlet, and provided with water operated safety pressure valve control means in said dispenser and path of water flow therethrough to a low pressure water discharge for enema and douche uses. However, a certain quantity of the fluid may pass through the slot or kerf 40 and any excess fluid instead of passing through the hole 26 will flow around the tube 24 at the by-pass 25 and be discharged through the outlet 19 at its bore 20 into a basin or other receptacle over which the device is fitted to the faucet. The assembly is adaptable to any faucet but is preferably used with a mixing faucet to obtain the desired temperature of water and as long as the dispenser is in a horizontal position, even when the water is turned on for adjusting the temperature, the shut-off is provided or produced by the valve rod 38 and should the pressure be too high or excessive and such as might cause injury to the part being treated, the danger thereof is eliminated by the seating of the valve rod against the restricted end, shoulder stop or seat 42 automatically, to prevent injury by cutting off the flow of fluid. The action of the water passing from the tube 28 to the tube 43 via the enlarged or funnel member 45 is such as to create a siphoning action to pick up or draw the antiseptic into the tube 43 for discharge, besides flowing into the container 36 and mixing therewith to form the proper strength solution in the necessary proportions required under the circumstances by reason of the adjustment of the spacing between the discharge end of the tube 28 and the funnel end 45 of the tube 38 in the manner previously described.

In administering an enema or douche, the dispenser automatically hangs in the position, illustrated in Figure 6, with the water flow upward through the container 36 and the valve rod drops down when slightly jarred, so as to furnish a constant means of instantly cutting off the flow when desired or necessary while the water flows through the outlet. This action will fail only if there is too much pressure and in such instance, the valve rod will automatically close off the flow of water, thereby acting as a safeguard against injury caused by too much pressure for such uses. This action has been thoroughly tested for accurate, perfect and effective performance in the manner described and the device may be economically produced of relatively inexpensive parts which may be readily assembled, adjusted, replaced or cleaned to maintain the same in a perfect sanitary condition. The shut-off is superior to types in known use such as clamps usually provided on the hose which serve but one purpose, namely, to cut off the flow or to permit same but which is not automatic and which must be manually operated. The tube 43 with the flared or conical end within the medicine container 36 serves as the outlet for the flow from the tube 28 with portions of the antiseptic mixed or in solution therewith and controlled by the flow of water with a siphon action as described. The operation is completely visible by reason of the transparency of the tubes when so provided, without depending upon the vision of the exit flow to determine same and desirably, the antiseptic or other medicant in the container 36 will be drawn or siphoned off so as to clear the container thereof after one gallon of water has passed through the container in approximately three minutes, although this may be varied if desired by arranging the adjacent ends of the tubes 28 and 43 at the proper distance apart. If they are further apart, the antiseptic will be distributed within more than one gallon of the water, and this ratio of water to antiseptic may be varied as desired.

I claim:

1. An enema and douche assembly or fountain syringe, including an adaptor to be connected to a source of water supply, said adaptor having an outlet and a by-pass around said outlet formed with a discharge opening, a medicant container, a first discharge tube having one end connected to said outlet and the other end thereof connected to a second tube adjustably extending into said container, a weight valve controlling the discharge through said second tube, a third tube in the container having one end thereof spaced from said second tube and having the other end thereof extending out of said container and whereby the water flowing through said tubes will pick up and carry the medicant disposed in said container along therewith.

2. An enema and douche assembly or fountain syringe, including an adaptor to be connected to a source of water supply, said adaptor having an outlet and a by-pass around said outlet with a discharge opening formed therein, a medicant container, a first tube having connection with said outlet and extending into said container, a rod valve controlling said discharge through the tube, a second tube in the container spaced from the first tube, a third tube connected to said second tube at its discharge end and adapted to carry a nozzle at its free end, the second tube having a flared end adjacent the discharge end of the first tube for escape of the water into the medicant in the container and adapted to siphon off the same in solution therewith for discharge from the nozzle.

3. An enema and douche assembly or fountain syringe, including an adaptor to be connected to a source of water supply, said adaptor having an outlet and a by-pass around said outlet with a discharge opening formed therein, a medicant container, a first tube extending into said container, a rod valve controlling said discharge through the tube, a second tube in the container spaced from the first tube, and a flexible tube connecting said outlet of the adaptor to said first tube, a second flexible tube connected to the outlet of the second tube and a nozzle at the free end of the second flexible tube.

4. An enema and douche assembly or fountain syringe, including an adaptor to be connected to a source of water supply, said adaptor having an outlet and a by-pass around said outlet with a discharge opening formed therein, a medicant container, a first tube having connection with said outlet and extending into the container, a rod valve controlling the discharge through said tube, and another tube in the container spaced from the first tube, said latter tube being adapted for the connection of a nozzle in flexible connection therewith.

5. An enema and douche assembly or fountain syringe, including an adaptor to be connected to a source of water supply, said adaptor having an outlet and a by-pass around said outlet with a discharge formed therein, a medicant container, a first tube having connection with the outlet and extending into the container, a rod valve controlling the discharge through said first tube, and another tube in the container spaced from the first tube, said tubes being adjustable toward and away from each other to vary the spacing therebetween to vary the quantity of medicant picked up by the water in a given length of time and the strength of the solution discharged from the second tube.

6. An enema and douche assembly or fountain syringe, including an adaptor to be connected to a source of water supply, said adaptor having an outlet and a by-pass around said outlet with discharge opening formed therein, a medicant container, a first tube having connection with said outlet and extending into said container, a rod valve controlling the discharge through said first tube, and another tube in the container spaced from the first tube, said tubes being adjustable relative one to the other to provide adjustment of the space between the tubes and the siphon action by which the fluid picks up and draws off the medicant from the container through the flow thereof and discharge from the second tube.

7. An enema and douche assembly or fountain syringe, including an adaptor to be connected to a source of water supply, said adaptor having an outlet and a by-pass around said outlet with a discharge opening formed in said by-pass, a medicant container, a first tube having connection with said outlet and extending into said container, a rod valve controlling the discharge through said first tube, and another tube in the container spaced from the first tube, said tubes being adjustable, said first tube having valve seats at its ends, the valve being in the form of a rod having a closed remote end and an opening in its opposite end through which some of the water may flow and adapted to automatically open by the action of the pressure beneath the remote end of the valve and above the adjacent end of the tube in which the valve is loosely fitted, said valve adapted to close automatically when the pressure is excessive.

8. An enema and douche assembly comprising an adaptor to be frictionally mounted on a faucet and having a depending outlet and a lateral tubular extension, a tube fitted in the extension and across the bore of the adaptor to provide passages therebetween, said tube having an escape opening in the bore, a flexible tube fitted on the first tube, a container for medicant, closures for the ends of said container, a second tube connected to the free end of the flexible tube and having end seats, a valve rod loosely movable in the second tube and having an opening in its near end and closed at its remote end, and a third tube in the container having a flared end adjustably spaced relative to the adjacent end of the second tube, and a flexible tube leading from the discharge end of the third tube and a nozzle at the free end of said latter flexible tube.

CARL FRANK CAPELL.

REFERENCES CITED

The following references are of record in the file of this patent:

UNITED STATES PATENTS

| Number | Name | Date |
|---|---|---|
| Re. 21,187 | Hooper | Aug. 29, 1939 |
| 964,730 | Ackerman | July 19, 1910 |
| 1,065,351 | Fyfe | June 24, 1913 |
| 1,606,366 | Hillman | Nov. 9, 1926 |
| 1,654,745 | Miller | Jan. 3, 1928 |
| 1,719,152 | Watson | July 2, 1929 |
| 2,112,145 | Courtney | Mar. 22, 1938 |